US012578040B2

(12) United States Patent
Subramanian et al.

(10) Patent No.: US 12,578,040 B2
(45) Date of Patent: Mar. 17, 2026

(54) HIGH PERFORMANCE SHOULDER RING FOR PIPE AND OTHER TUBULAR GOODS IN THE OIL AND GAS INDUSTRY

(71) Applicant: Premiere, Inc., Houston, TX (US)

(72) Inventors: Jayaram Subramanian, Spring, TX (US); Sidney C. Ramos, Austin, TX (US); Catalin Teodoriu, Norman, OK (US); Barry J. Matherne, Denver, CO (US); Lee J. Matherne, The Woodlands, TX (US); Kyle Mowbray, Houston, TX (US)

( * ) Notice: Subject to any disclaimer, the term of this patent is extended or adjusted under 35 U.S.C. 154(b) by 0 days.

(21) Appl. No.: 18/009,680

(22) PCT Filed: Jun. 9, 2021

(86) PCT No.: PCT/US2021/036699
§ 371 (c)(1),
(2) Date: Dec. 9, 2022

(87) PCT Pub. No.: WO2021/252698
PCT Pub. Date: Dec. 16, 2021

(65) Prior Publication Data
US 2023/0228350 A1      Jul. 20, 2023

Related U.S. Application Data

(60) Provisional application No. 63/036,759, filed on Jun. 9, 2020.

(51) Int. Cl.
*F16L 15/00*      (2006.01)
*F16L 15/08*      (2006.01)

(52) U.S. Cl.
CPC ............. *F16L 15/002* (2013.01); *F16L 15/08* (2013.01)

(58) Field of Classification Search
CPC ..... F16L 21/002; F16L 15/001; F16L 15/003; F16L 15/08; F16L 15/04; F16L 15/004; F16L 15/002; E21B 17/08
See application file for complete search history.

(56) References Cited

U.S. PATENT DOCUMENTS 4,696,498 A * 9/1987 Church .................. F16L 15/002
285/334
2010/0032166 A1* 2/2010 Slack ................... B25B 27/0028
285/333

(Continued)

*Primary Examiner* — Aaron M Dunwoody
(74) *Attorney, Agent, or Firm* — Quisenberry Law PLLC; C. Dale Quisenberry

(57)      ABSTRACT

A coupled pipe connection system may include a coupling with internal threads adapted for joining two pipe sections by threaded engagement of external pipe threads with the internal coupling threads. A torque ring may be disposed within the coupling and between the first pipe and the second pipe. The torque ring may an outer cylindrical surface, at least a portion of which may include a plurality of tapered threads engaged with and tapered to match a mid-length axial section/J-space of the inner threads of the coupling. Annular faces of the torque ring may be beveled inwardly or outwardly and adapted for mating engagement with corresponding beveled annular faces of the pipe ends. Torque rings of gradually decreasing axial lengths may be incrementally swapped out as the number of make-up cycles increases. Couplings having internal shoulders of gradually decreasing axial lengths may be used instead of torque rings.

33 Claims, 9 Drawing Sheets

(56)  References Cited

U.S. PATENT DOCUMENTS

| | | | |
|---|---|---|---|
| 2011/0025050 A1* | 2/2011 | Holller ................... | F16L 15/003 |
| | | | 285/333 |
| 2014/0054891 A1* | 2/2014 | Ames ................... | F16L 15/002 |
| | | | 285/390 |

* cited by examiner

Fig 1
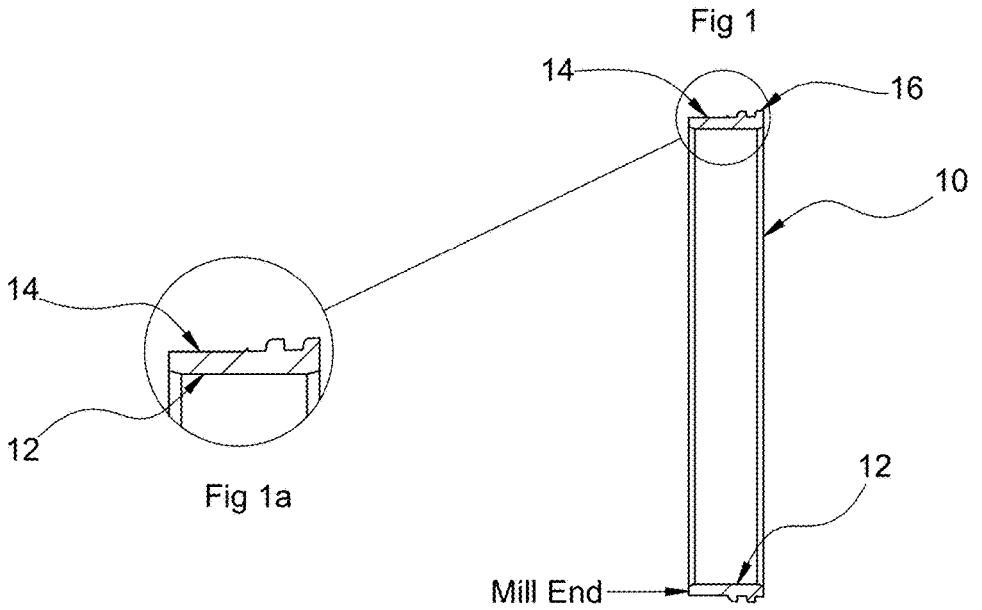
Fig 1a
Mill End
Fig 2
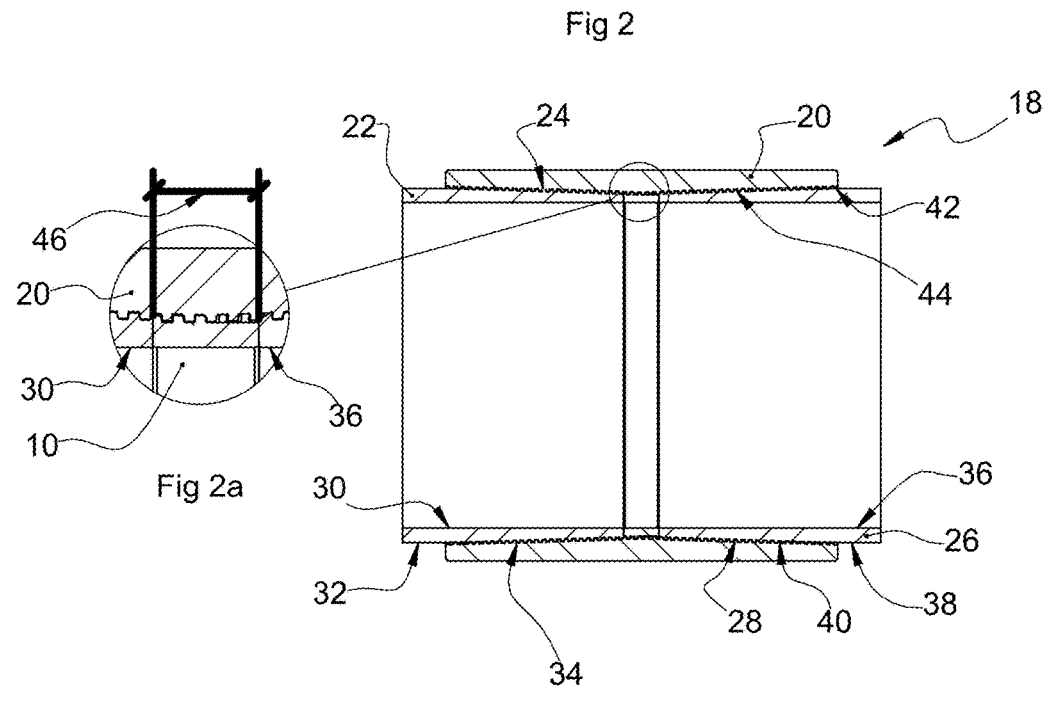
Fig 2a

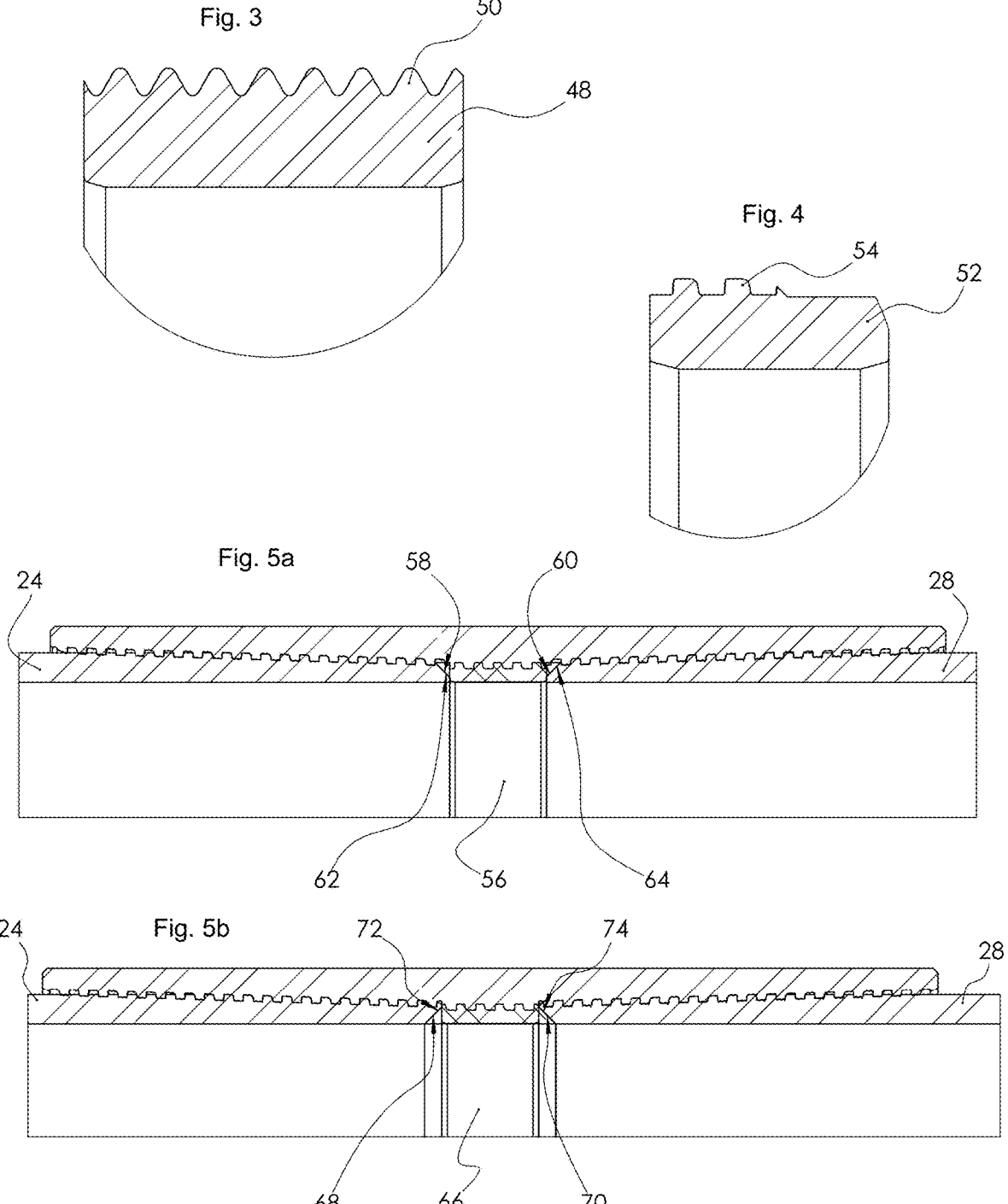

Fig. 7a
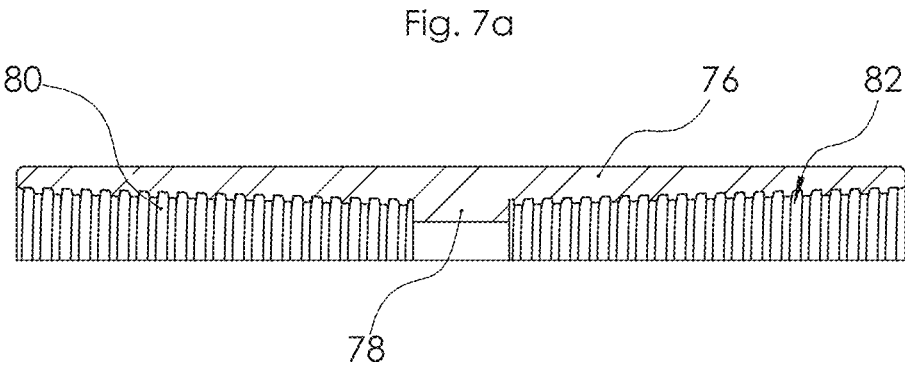
Fig. 7b
Fig. 7c
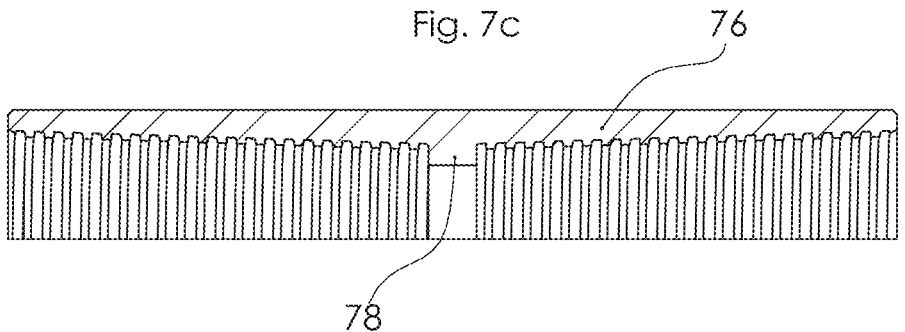

10

10

HIGH PERFORMANCE SHOULDER RING FOR PIPE AND OTHER TUBULAR GOODS IN THE OIL AND GAS INDUSTRY

RELATED APPLICATIONS

This application claims the benefit of U.S. Provisional Application No. 63/036,759, filed Jun. 9, 2020, the contents of which are fully incorporated herein by reference.

BACKGROUND OF THE INVENTIONS

1. Field of the Inventions

The present invention relates to threaded and coupled connections which either employ a torque ring or coupling shoulder to increase and maintain torsional capacity and control stresses within said connection.

2. Description Of The Related Art

After a well has been drilled to a desired depth, large diameter and relatively heavy pipe known as "casing" is frequently installed in the well. During installation, such casing is typically inserted into the pre-drilled well bore in a number of separate sections of substantially equal length commonly referred to as "joints." The joints, which generally include threaded connections at each end, are typically joined axially in end-to-end orientation at the earth's surface (typically from a drilling rig) in order to form a substantially continuous "string" of pipe that reaches downward into the well. After the casing is installed within the well bore, the pipe string is usually cemented in place.

In addition to casing, drill pipe and other tubular goods used to drill, complete and service subterranean wellbores are also commonly joined together in end-to-end orientation using threaded connections. Many of these threaded connections—and particularly those used with casing and certain types of tubing—have tapered threads without shoulders. Frequently, such connections employ internally threaded couplings installed between adjacent pipe joints in order to link or join two externally threaded pipe sections together; during the "make up" or connection process, a specified or predetermined amount of torque force is typically applied to a pipe joint in order to mate the threaded connection of said pipe joint with the threaded connection of a coupling.

Such couplings typically have a somewhat larger outer diameter than the outer diameter of the adjacent pipe joints being joined. Further, such couplings generally have opposing tapered box threads designed to receive tapered, threaded ends of the pipe sections to be joined (often referred to as "pins"). When joined together, such threaded couplings structurally secure adjoining pipe sections together in series, and form a fluid pressure seal between said joined pipe sections.

In many instances, torque forces are applied to an assembled pipe string while such pipe string is at least partially disposed within a wellbore such as, for example, to rotate said pipe string within said wellbore. Frequently, such subterranean wellbores can include deviations from a true vertical path, at least to some degree, which can result in additional torque being applied at the earth's surface in order to transmit such torque forces to the bottom of a wellbore. As a result, such torque forces applied to a pipe string can sometimes exceed specification torque required to "make up" or screw threaded connections together. In such situations, excess torque forces may further drive the pin threads into the threaded connections of the couplings. As such, there is a need to allow the couplings to accept more torque without further running of the threads.

The oil and gas industry frequently employs floating shoulder rings in order to increase the torque capacity of threaded connections employing threaded couplings. Such floating shoulder rings are typically received within the internal bore of a threaded coupling, and are relatively small compared to the couplings into which they are installed. Functionally, a floating shoulder ring is installed inside the central bore of a coupling between the two opposing pins (threaded ends) of adjacent pipe joints, in an area frequently referred to as the "J space". Such floating shoulder rings and couplings are described in detail in U.S. Pat. No. 8,091,930, which is incorporated herein by reference for all purposes.

Previously, there had been little need to rotate a casing string with more torque than its assembly torque (that is, the torque required to add a threaded joint to the existing pipe string); however lateral wells are now being drilled into relatively thin shale formations to produce gas and oil. Rotation of an assembled pipe string can be required to get the assembled pipe string through a bend from a vertical section of a well to a lateral section of a well; often, this requires application of more torque forces to the assembled pipe string than the assembly torque. Further, axial force is frequently applied to the assembled pipe string in order to "push" the assembled pipe string within a wellbore, which increases axial stress on the inside of the bend. Therefore, a need exists to increase the axial compressive force that a casing threaded connection can withstand without leakage or damage.

As noted above, many threaded connections used on casing do not employ a coupling shoulder to remain cost-effective, which leaves no shoulder to abut the end of a pin for added torque. In such cases, said torque rings have been inserted within couplings between the opposing ends of pipe joints to contact and increase the torque the connection can withstand.

Similarly, tubing connections are frequently used for repeated trips in and out of wellbores. Expensive tubing connections such as connections threaded onto upset portions of the pipe ends are utilized in order to drill out corroded pipe, packers or other obstructions within the wellbore. Remediation may require many trips in and out of the well, before a replacement production string can begin to flow anew and such operations dictate a reliable connection with enhanced torque and sealability. Thus, there exists a need to increase mechanical capacity of pipe connections while reducing costs to remain cost effective.

Due to varying tolerances or the use of a used pipe string, significant variations may exist between a "field end" of a coupling as compared to a "mill end" of the coupling. In a case where the mill end pin has a higher diametrical interference than its field end counterpart, the mill end pin will build up high hoop stresses and the field end will begin to yield the pin nose to attain prescribed torque. Conversely when the mill end pin is loose, it will tend to yield the pin nose in order to attain the prescribed torque and the field end will build up high hoop stresses.

In the case of a loose pin, in which the threads are unable to provide sufficient torsional resistance, the pin nose is in compression, even before the theoretical shoulder torque is reached. Therefore, the connection will begin yielding at the pin nose prior to reaching its intended total torque. The side wherein the pin nose has yielded will decrease torsion resistance and shear strength of the threads due to stress preloading; further, the threads will fail to generate their potential torque and as a result, total torque will be reduced in an amount equal to reduced shoulder torque.

A properly dimensioned torque ring can be placed at the mill end nose of sufficient thickness to allow the field end pin have proper standoff based upon the diametrical interference between field pin and coupling thread thereby equalizing hoop stresses within the connection.

Each time a tubing connection is made up and broken out, the threaded members undergo some plastic deformation and thread surfaces begin to wear. This reduces radial interference between box and pin members and, ultimately, the torque forces that the connection can withstand. When a torque ring is inserted in the J space, the mid-length area of the coupling or box starting after the connections make-up loss, as measured from each coupling end, overall torsional capacity is increased due to contact between pin face and ring face. Since the ring acts as a barrier to further ingress of the pin into the box, each successive make-up lowers shoulder torque due to plastic yield and wear of the threads. Higher shoulder torques, those torques derived from thread interference, could be maintained if the pin could travel further into the connection by a prescribed amount before reaching the torque ring.

The use of a torque ring as described herein include enhanced sealability of a threaded connection by means of a controlled bearing load between the pin face and ring face. With a torque ring dimensioned to optimize the cross-sectional area of the face, the bearing pressure between pin faces and ring faces will exceed the internal pressure rating of the pipe, and thereby provide reliable sealing surfaces. This feature further provides protection against thread corrosion and thread washout. The smooth bore provided by means of abutment between pin faces and ring faces increases flow within the bore and the bearing load between said faces reduces overall bending stresses.

Thus, there is a need for a robust shoulder ring that can structurally support torque forces applied to threaded pipe connections, and particularly coupled threaded pipe connections.

SUMMARY OF THE INVENTIONS

In one aspect, the present inventions may include a coupled pipe connection system comprising: a coupling having a bore therethrough defining an inner surface having a plurality of tapered inner threads disposed on opposite ends of the coupling, and tapering toward a central portion of the coupling where an inner diameter of the coupling is smaller than inner diameters of the coupling at its opposite ends; a first pipe having a first pin, the first pipe having an inner cylindrical surface and an outer cylindrical surface, the outer cylindrical surface including a plurality of tapered outer threads disposed therearound, the tapered outer threads on the first pipe being threadably engaged with the tapered inner threads on a left mill side of the coupling; a second pipe having a second pin, the first pipe having an inner cylindrical surface and an outer cylindrical surface, the outer cylindrical surface including a plurality of tapered outer threads disposed therearound, the tapered outer threads on the second pipe being threadably engaged with the tapered inner threads on a right field side of the coupling; and a torque ring disposed within the coupling and between the first pin and the second pin, the torque ring having an inner cylindrical surface, an outer cylindrical surface, and an outer tapered threaded surface having a plurality of tapered threads engaged with and tapered to match a mid-length axial section of the inner threads of the coupling. Another feature of this aspect of the present inventions may be that inner diameters of the first pin, the second pin, and the torque ring are substantially equal. Another feature of this aspect of the present inventions may be that the first pin, the second pin, and the torque ring are in co-axial alignment so that the inner cylindrical surfaces of the torque ring, the first pipe and the second pipe form a continuous inner cylindrical surface within the connection system. Another feature of this aspect of the present inventions may be that a major diameter of the tapered threads on the torque ring are adjacent a field end face of the torque ring, and the field end face of the torque ring is in contact with a field end face of the second pin. Another feature of this aspect of the present inventions may be that the torque ring is centrally positioned radially and axially with the mid-length axial section of the coupling. Another feature of this aspect of the present inventions may be that an axial length of each of the threads on the outer surface of the torque ring is less than an axial length of each of the outer threads on the first and second pins. Another feature of this aspect of the present inventions may be that the threads on the outer surface of the torque ring are truncated. Another feature of this aspect of the present inventions may be that the torque ring includes at least one bevel formed towards a center outer diameter of the torque ring. Another feature of this aspect of the present inventions may be that the torque ring includes at least one bevel formed away from a center outer diameter of the torque ring. Another feature of this aspect of the present inventions may be that each of opposed faces of the torque ring includes a planar face section and a beveled surface extending downwardly from the planar face section and away from a central inner diameter of the torque ring to form opposed first and second beveled surfaces adapted for engagement with corresponding internal chamfers on the internal cylindrical surfaces of the first and second pipes. Another feature of this aspect of the present inventions may be that each of opposed faces of the torque ring includes a planar face section and a beveled surface extending upwardly from the planar face section and away from a central outer diameter of the torque ring to form opposed first and second beveled surfaces adapted for engagement with corresponding external chamfers on the outer cylindrical surfaces of the first and second pipes.

In another aspect, the present inventions may include a coupled pipe connection system including interchangeable torque rings comprising: a coupling having a bore therethrough defining an inner surface having a plurality of tapered inner threads disposed on opposite ends of the coupling, and tapering toward a central portion of the coupling where an inner diameter of the coupling is smaller than inner diameters of the coupling at its opposite ends; a first pipe having a first pin, the first pipe having an inner cylindrical surface and an outer cylindrical surface, the outer cylindrical surface including a plurality of outer threads disposed therearound, the outer threads on the first pipe being threadably engaged with the inner threads on a left mill side of the coupling; a second pipe having a second pin, the first pipe having an inner cylindrical surface and an outer cylindrical surface, the outer cylindrical surface including a plurality of outer threads disposed therearound, the outer threads on the second pipe being threadably engaged with the inner threads on a right field side of the coupling; and at least a first torque ring, and a second torque ring, each of the torque rings being adapted to be sequentially disposed within the coupling and between the first pin and the second pin, each torque ring having an inner cylindrical surface and an outer cylindrical surface, at least a portion of the outer cylindrical surface of each torque ring including a plurality of threads engaged with and dimensioned to match a mid-length axial section of the inner threads of the coupling, the mid-length axial section having a J-space length, the first torque ring having an axial length not greater than the J-space length, and the second torque ring having an axial length less than the axial length of the first torque ring. Another feature of this aspect of the present inventions may be that the threads on the outer cylindrical surface of the torque ring are cylindrical threads partially extending across an axial length of the torque ring. Another feature of this aspect of the present inventions may be that the threads on the outer cylindrical surface of the torque ring are cylindrical threads fully extending across an axial length of the torque ring. Another feature of this aspect of the present inventions may be that the threads on the outer cylindrical surface of the torque ring are tapered threads partially extending across an axial length of the torque ring. Another feature of this aspect of the present inventions may be that each of the first torque ring and the second torque ring is simultaneously disposed within the coupling and between the first pin and the second pin. Another feature of this aspect of the present inventions may be that an axial length of each of the threads on the outer surface of the torque ring is less than an axial length of each of the outer threads on the first and second pins. Another feature of this aspect of the present inventions may be that the threads on the outer surface of the torque ring are truncated. Another feature of this aspect of the present inventions may be that the torque ring includes at least one bevel formed towards a center outer diameter of the torque ring. Another feature of this aspect of the present inventions may be that the torque ring includes at least one bevel formed away from a center outer diameter of the torque ring. Another feature of this aspect of the present inventions may be that each of opposed faces of the torque ring includes a planar face section and a beveled surface extending downwardly from the planar face section and away from a central inner diameter of the torque ring to form opposed first and second beveled surfaces adapted for engagement with corresponding internal chamfers on the internal cylindrical surfaces of the first and second pipes. Another feature of this aspect of the present inventions may be that each of opposed faces of the torque ring includes a planar face section and a beveled surface extending upwardly from the planar face section and away from a central outer diameter of the torque ring to form opposed first and second beveled surfaces adapted for engagement with corresponding external chamfers on the outer cylindrical surfaces of the first and second pipes.

In yet another aspect, the present inventions may include a coupled pipe connection system including interchangeable couplings comprising: at least a first coupling and a second coupling adapted to be sequentially used as part of the coupled pipe connection system, each coupling having a bore therethrough defining an inner surface having a centrally disposed internal shoulder, each coupling including a first plurality of tapered inner threads disposed on a left side of the shoulder and a second plurality of tapered inner threads disposed on a right side of the shoulder, the internal shoulder of the first coupling having a first axial length, the internal shoulder of the second coupling having a second axial length less than the first axial length; a first pipe having a first pin, the first pipe having an inner cylindrical surface and an outer cylindrical surface, the outer cylindrical surface including a plurality of outer threads disposed therearound, the outer threads on the first pipe being threadably and sequentially engaged with a first plurality of tapered inner threads on one of the first coupling and the second coupling; and a second pipe having a second pin, the first pipe having an inner cylindrical surface and an outer cylindrical surface, the outer cylindrical surface including a plurality of outer threads disposed therearound, the outer threads on the second pipe being threadably and sequentially engaged with a first plurality of tapered inner threads on one of the first coupling and the second coupling.

In still another aspect, the present inventions may include a coupled pipe connection system comprising: a first pipe having a first pin, the first pin having an inner cylindrical surface and an outer cylindrical surface, the outer cylindrical surface including a plurality of outer threads disposed therearound; a second pipe having an upset box and a main body, the upset box including an internal annular surface having a plurality of tapered box threads disposed therein, the internal annular surface terminating in an annular abutment joining the internal annular surface of the upset box to a main cylindrical bore within the main body, the plurality of outer threads on the first pipe being threadably engaged to the tapered box threads; and at least one torque ring disposed within the upset box and between a distal end of the first pipe and the annular abutment within the second pipe, each torque ring having an inner cylindrical surface, an outer cylindrical surface, and an outer threaded surface at least a portion of the outer cylindrical surface including a plurality of tapered threads engaged with the box threads. Another feature of this aspect of the present inventions may be that inner diameters of the first pin, the second pipe, and the torque ring are equal. Another feature of this aspect of the present inventions may be that the first pin, the second pipe, and the torque ring are in co-axial alignment so that the inner cylindrical surfaces of the torque ring, the first pin and the second pipe form a continuous inner cylindrical surface within the connection system. Another feature of this aspect of the present inventions may be that an axial length of each of the threads on the outer surface of the torque ring is less than an axial length of each of the outer threads on the first pin. Another feature of this aspect of the present inventions may be that the threads on the outer cylindrical surface of the torque ring are cylindrical threads partially extending across an axial length of the torque ring. Another feature of this aspect of the present inventions may be that the threads on the outer cylindrical surface of the torque ring are cylindrical threads fully extending across an axial length of the torque ring. Another feature of this aspect of the present inventions may be that the threads on the outer surface of the torque ring are truncated. Another feature of this aspect of the present inventions may be that the torque ring includes at least one bevel formed towards a center outer diameter of the torque ring. Another feature of this aspect of the present inventions may be that the torque ring includes at least one bevel formed away from a center outer diameter of the torque ring. Another feature of this aspect of the present inventions may be that each of opposed faces of the torque ring includes a planar face section and a beveled surface extending downwardly from the planar face section and away from a central inner diameter of the torque ring to form opposed first and second beveled surfaces adapted for engagement with corresponding internal chamfers on the internal cylindrical surfaces of the first and second pipes. Another feature of this aspect of the present inventions may be that each of opposed faces of the torque ring includes a planar face section and a beveled surface extending upwardly from the planar face section and away from a central outer diameter of the torque ring to form opposed first and second beveled surfaces adapted for engagement with corresponding external chamfers on the outer cylindrical surfaces of the first and second pipes.

Other features, aspects and advantages of the present inventions will become apparent from the following discussion and detailed description.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 1 depicts a sectional view of a partially threaded tapered ring.

FIG. 1*a* is an exploded view of a portion of torque ring shown in FIG. 1.

FIG. 2 depicts a sectional view of a partially threaded ring seated within a coupled pipe connection.

FIG. 2*a* is an exploded view of a portion of the connection shown in FIG. 2.

FIG. 3 depicts an enlarged sectional view of a fully threaded non-tapered ring depicting thinned threads.

FIG. 4 depicts an enlarged sectional view of a partially threaded tapered ring depicting thinned threads.

FIG. 5*a* depicts a partial sectional view of a ring face having a bevel formed towards the center OD of the ring with a complimentary pin face bevel.

FIG. 5*b* depicts a partial sectional view of a ring face having a bevel formed away from the center OD of the ring with a complimentary pin face bevel.

FIG. 7*a* depicts a sectional view of a coupling with a shoulder having an axial length substantially as long as the J space.

FIG. 7*b* depicts a sectional view of a coupling with a shoulder having an axial length less than the axial length of the J space.

FIG. 7*c* depicts a sectional view of a coupling with a shoulder having an axial length substantially less than the axial length of the J space.

Figures 6A, 6B, 6C:
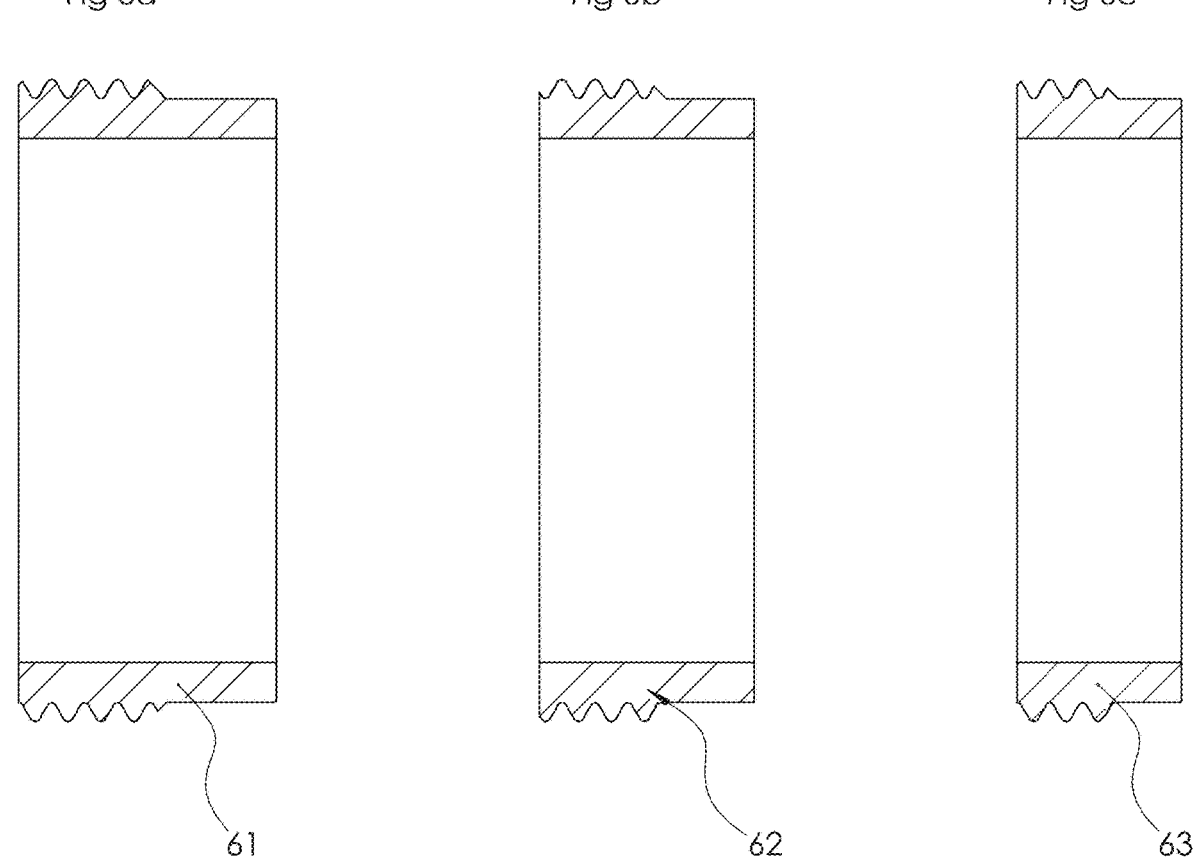
FIG. 6*a* depicts a sectional view of a ring with an axial length substantially as long as the J space.
FIG. 6*b* depicts a sectional view of a ring with an axial length less than the axial length of the J space.
FIG. 6*c* depicts a sectional view of a ring with an axial length substantially less than the J space.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Features are disclosed which allow a threaded and coupled tapered connection to withstand higher imposed torques, increased number of make and break cycles and greater mechanical properties with the use of a properly designed torque ring or torque shoulder situated within a coupling.

After repeated make and breaks, shoulder torque, the torsional resistance generated by interference fit and friction between mating pin and box threads, declines due to a combination of worn threads and plastic yielding. The present inventions disclose the use of multiple torque rings to offset wear and plastic yielding by progressively substituting rings of shorter and shorter axial lengths to maintain a predetermined hoop stress range. The low end of the range must provide sufficient bearing pressure on the shoulder abutment to maintain a reliable seal and a high end hoop stress must not to exceed the bearing capacity of the ring and pin face, as calculated from the minimum surface area in mutual contact between pin and ring faces. Such substitutions can be repeated in order to maximize the utility of a connection which requires multiple make and break cycles.

The torque rings of the present inventions are dimensioned with varying axial lengths and may be positioned selectively within the J space such that a desired radial interference can be achieved on both the mill end and the field end threads regardless if the interference between box and pin is equal or different on a respective side of the coupling relative to the opposite end. To facilitate multiple make and breaks and also to maintain appropriate interference between box and pins the torque ring is exchanged with ones having a shorter axial length than the ring in situ so as to avoid a drop in thread torque to a level nearing an undesired thread torque value.

The torque rings of the present inventions are dimensioned with a non-interference radial fitment to the internal coupling threads in order to facilitate ease of retraction and replacement. Threads may be tapered or cylindrical, partially extending across the axial OD of the ring, or fully. Threads on the ring, box or both may be truncated to allow for the desired fitment as well. In addition, the rings may be axially thinned as compared to their mating coupling threads to further increase the ease of ingress and regress from the coupling. The torque ring threads may utilize any thread form, however it is likely the present inventions will see their greatest application to the ubiquitous API tapered thread forms.

The torque rings of the present inventions may be formed with an outer tapered thread extending partially across the ring OD and which substantially conforms to the centermost coupling threads where the smallest coupling ID is formed. The cylindrical portion of the ring will preferably be installed toward the mill end of the connection the complimentary mating threads substantially retarding the advancement of the ring mid-length past the coupling mid-length. Such a configuration will provide several benefits. Faster make-up speeds may be achieved as the greater surface area of the field end ring face provides resistance to impact loading as the pin is driven into the box. The tapered threads will also center the ring to better assure desired alignment of ring and pin ID's.

A method disclosed herein to increase the surface area of the pin and ring faces, and thereby increase Delta torque (the torsional resistance generated by the interference between pin face and either ring face or coupling shoulder abutment) is to taper the ring face either inward toward the center of the ring or shoulder OD, or away from the center of the ring or shoulder abutment OD. The pin face beveled to be complimentary. A tapered face will have more surface area in contact then a non-beveled face of equal radial widths.

When pin and coupling dimensions can be controlled such that tolerances there between are more closely mated, the use of the torque rings disclosed herein can control plastic yielding of the pin. It is preferred the ring material be of higher strength, so any yielding between pin and ring will result in pin deformation. If higher torque forces are imposed on the connection than expected cause yielding, such yielding will tend to yield the pin in a substantial axial direction, rather than significantly reducing the bore of the connection. As the pin begins to yield uniformly, the increased surface area of the pin face will increase the torsional capacity of the connection, unless and until such loads become excessive. Such a feature is not meant to be quantifiable in rating the connection, but understood to provide a higher level of safety during an unexpected event.

The present inventions provide another means to balance the hoop stresses between mill and field ends of the connection and increase the ability of the threads to withstand greater make and break cycles. Rather than substitute rings of varying thicknesses as described herein, couplings may be dimensioned with internal shoulder abutments having varied axial lengths, such as shown in FIGS. 7a-7c. As torque from threads decreases, the coupling may be exchanged with a coupling having a shoulder abutment of lesser axial length than the coupling it replaces. This substitution may be made as many times as benefit may be conferred. When the center shoulder abutment has a lesser axial length than the J space, said shoulder may be dimensioned to bias one side of the center section such that stresses are balanced in the connection.

Use of shoulder rings in collared threaded connections of tubular goods allows application of increased torque forces to said connections well beyond the torque capacity of such connections (collars and pins) alone. Such shoulder rings allow the tapered end of each opposing threaded pipe section to engage against a shoulder, disposed between said opposing tapered ends, thereby preventing excessive torque forces from overloading the threads of said threaded connection (both the male pin-end connections, as well as female box-end connections of a collar).

When two opposing pin faces come into contact with a shoulder ring (which is disposed between said opposing pin faces), hoop stress that would normally be applied to the female threads of a collar is relieved. Such hoop stress and overloading of pipe threads is frequently a limiting factor on the amount of torque forces that can be applied to a threaded tubular connection. Minimizing the effects of overloading threads of a threaded connection, as well as the associated hoop stress, by using a should ring enables application of 50-150% more torque forces to a threaded connection during make up of said connection compared to a threaded connection without a shoulder ring, all without damaging said threaded connection.

However, with an increase in torque forces applied to a threaded connection, there is also an associated increase in axial force that opposing pin shoulders apply to a "sandwiched" shoulder ring. In certain situations, such axial force can be so great that it exceeds the elastic limits of the pipe, and one or both of the pin nose(s) become deformed.

As a result, it is beneficial to ensure that the shoulder torque ring does not go beyond its plastic memory. In order to accomplish this, the grade of the material used to manufacture the shoulder ring must be superior to the grade of material of the pipe (for example, for casing with a grade of P110 the material of the shoulder ring needs to be Q125 or greater).

With reference to FIG. 1, a sectional view of a partially threaded tapered ring 10 is shown. The torque ring 10 includes an inner cylindrical surface 12 and an outer cylindrical surface 14, a portion of which is provided tapered threads 16.

FIG. 2 depicts a sectional view of a partially threaded ring 10 seated within a coupled pipe connection system 18. As illustrated in FIG. 2, the coupled pipe connection system 18 is shown comprising a coupling 20, a first pipe 22 having a first pin 24, a second pipe 26 having a second pin 28, and a torque ring 10, such as shown in FIG. 1. The first pipe 22 has an inner cylindrical surface 30 and an outer cylindrical surface 32 having a plurality of outer tapered threads 34 disposed therearound. The second pipe 26 has an inner cylindrical surface 36 and an outer cylindrical surface 38 having a plurality of outer tapered threads 40 disposed therearound.

The coupling 20 includes a bore 42 therethrough defining an inner surface having a plurality of tapered inner or box threads 44 disposed on opposite ends of the coupling 20, and tapering toward a central portion of the coupling where an inner diameter of the coupling 20 is smaller than inner diameters of the coupling 20 at its opposite ends. The outer threads 34 on the first pipe 22 are shown threadably engaged with the inner threads 44 on a left side of the coupling 20. The outer threads 40 on the second pipe 26 are shown threadably engaged with the inner threads 44 on a right side of the coupling 20. The torque ring 10 is shown disposed between the first pin 24 and the second pin 28, with its tapered threads 16 engaged with a mid-length axial section 46 of the inner threads 44 of the coupling 20, also sometimes referred to as the "J-space". In a specific embodiment, the tapered threads 16 around the torque ring 10 may be tapered to match the box threads 44.

Inner diameters of the first pin 24, the second pin 28, and the torque ring 10 are preferably equal. In a specific embodiment, when the first pin 24, the second pin 28, and the torque ring 10 are threadably engaged with the tapered box threads 44 on the coupling 20 as shown in FIG. 2, they are in co-axial alignment so that the inner cylindrical surfaces 12, 30 and 36 of the torque ring 10, the first pipe 22 and the second pipe 26 form a continuous inner cylindrical surface within the connection system 18.

Referring again to the torque ring 10 shown in FIG. 1, a left side of the torque ring 10 may be referred to as the mill end, and the right side of the torque ring 10 may be referred to as the field end. In a specific embodiment, the mill end may be adjacent the portion of the outer cylindrical surface 14 that is flat, i.e., does not have any threads, whereas the field end may be adjacent the portion of the outer cylindrical surface 14 having the tapered threads 16. When the torque ring 10 is installed, such as shown in FIG. 2, the field end having the tapered threads 16 provides for a greater surface area of contact between the torque ring 10 and adjacent second pin 28 as compared to the surface contact area between the mill end of the torque ring 10 and adjacent first pin 24.

With reference to FIG. 2, another feature of the torque ring 10 is that the interaction between the outer cylindrical surface 14 including the threads 16 of the torque ring 10 with the tapered box threads 44 in the mid-length axial section 46 functions to centralize the torque ring 10 radially and axially with the mid-length axial section 46/J-space.

FIG. 3 depicts an enlarged sectional view of a fully threaded non-tapered ring 48 depicting thinned threads 50. In a specific embodiment, the threads 50 may be 8rd cylindrical threads fully across the ring outer diameter. The threads 50 may be thinned so as to be more narrow than mating box threads. In a specific embodiment, the threads 50 may be truncated and have a relatively lower height as shown in FIG. 3.

FIG. 4 depicts an enlarged sectional view of a partially threaded tapered ring 52 depicting thinned threads 54. Buttress tapered threads 54 may extend partially across the ring 52 outer diameter. The threads 54 may be thinned so as to be narrower than mating box threads.

FIG. 5a depicts a partial sectional view of another specific embodiment of a torque ring 56 in which each of opposed left and right ring faces 58 and 60 is beveled towards the center OD of the ring 56. Similarly, the first pin 24 includes a complementary first pin face bevel 62 inclined toward the center OD of the ring 56 and adapted for mating engagement with the left beveled ring face 58. Likewise, the second pin 28 includes a complementary second pin face bevel 64 including toward the center OD of the ring 56 and adapted for mating engagement with the right beveled ring face 60.

FIG. 5b depicts a partial sectional view of another specific embodiment of a torque ring 66 in which each of opposed left and right ring faces 68 and 70 is beveled away the center OD of the ring 66. Similarly, the first pin 24 includes a complementary first pin face bevel 72 inclined away from the center OD of the ring 66 and adapted for mating engagement with the left beveled ring face 68. Likewise, the second pin 28 includes a complementary second pin face bevel 74 including away from the center OD of the ring 66 and adapted for mating engagement with the right beveled ring face 70.

FIG. 6a depicts a sectional view of a ring with an axial length substantially as long as the J space. FIG. 6b depicts a sectional view of a ring with an axial length less than the axial length of the J space. FIG. 6c depicts a sectional view of a ring with an axial length substantially less than the J space. In certain situations, as discussed elsewhere herein, it may be desirable to screw and unscrew the pipe and coupling connections multiple times. As this is done more and more times, the threads will gradually deform. As this happens, it becomes desirable for the pipes/pins to be screwed further into the coupling 20 to achieve the desired performance and/or maintain desired thread/torque levels. As such, to facilitate this, it has been discovered that it is advantageous to gradually shorten the axial length of the torque ring. With this shortening, the torque ring will occupy less of the J-space and allow the two pins to be threaded further into the coupling.

FIG. 7a depicts a sectional view of a coupling 76 with an internal shoulder 78 having an axial length substantially as long as the J space. The coupling may include a first tapered threaded section 80 to the left of the shoulder 78, and a second tapered threaded section 82 to the right of the shoulder 78. FIG. 7b depicts a sectional view of a coupling 76 with a shorter internal shoulder 78 having an axial length less than the axial length of the J space. FIG. 7c depicts a sectional view of a coupling 76 with a still shorter shoulder 78 with an axial length substantially less than the axial length of the J space. The purpose of the gradually shortening of the axial length of the shoulder 78 is the same as described above with respect to the shortening of the axial length of the torque rings 10 shown in FIGS. 6a-6c.

Figures 8A, 8B:
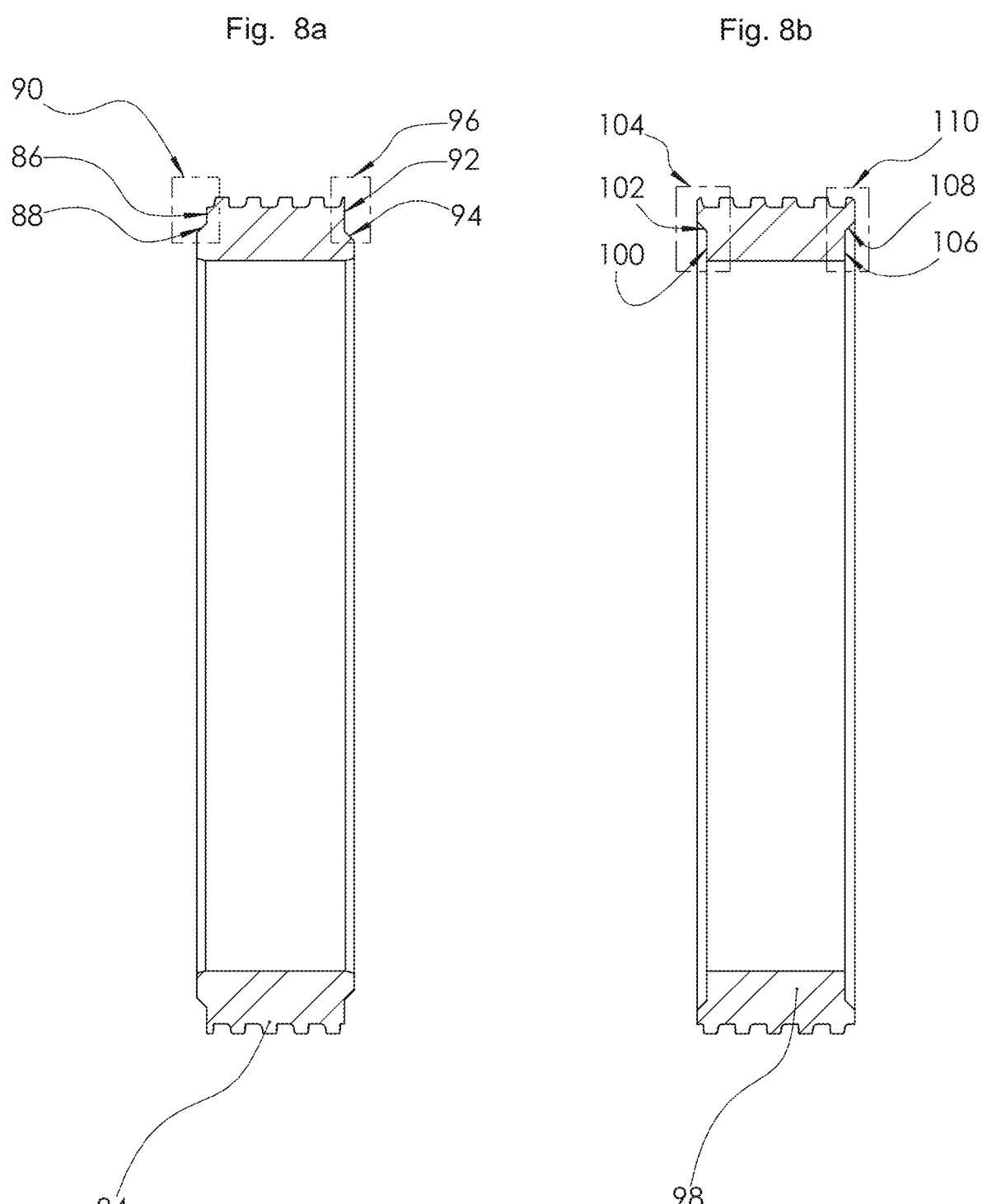
FIGS. 8*a* and 8*b* depict a sectional view of a threaded torque ring having a bifurcated taper on the ring face made complimentary to a pin face's internal or external chamfer.

FIG. 8a depicts another specific embodiment of a threaded torque ring 84 having a bifurcated taper comprising a first inset 86 on a left side or first ring face of the torque ring 84. The first inset 86 may include a first beveled surface 88 leading from the inner diameter of the torque ring 84 to a first upstanding face section 90. Similarly, the torque ring 84 bifurcated taper may include a second inset 92 on a right side or second ring face of the torque ring 84. The second inset 92 may include a second beveled surface 94 leading from the inner diameter of the torque ring 84 to a second upstanding face section 96. The first pin 24 may include an internal chamfer adapted to form a first pin mating surface complementary to and adapted for mating engagement with the first inset 86. Likewise, the second pin 28 may include an internal chamfer adapted to form a second pin mating surface complementary to and adapted for mating engagement with the second inset 92. In this manner, torque increases with the increased mating surface area, and the first and second pins 24 and 28 are guided into precision alignment with the torque ring 84.

FIG. 8b depicts another specific embodiment of a threaded torque ring 98 having a bifurcated taper comprising a first inset 100 on a left side or first ring face of the torque ring 98. The first inset 100 may include a first beveled surface 102 leading from the outer diameter of the torque ring 98 to a first planar face section 104. Similarly, the torque ring 84 bifurcated taper may include a second inset 106 on a right side or second ring face of the torque ring 98. The second inset 106 may include a second beveled surface 108 leading from the outer diameter of the torque ring 98 to a second planar face section 110. The first pin 24 may include an external chamfer adapted to form a first pin mating surface complementary to and adapted for mating engagement with the first inset 100. Likewise, the second pin 28 may include an external chamfer adapted to form a second pin mating surface complementary to and adapted for mating engagement with the second inset 106. In this manner, torque increases with the increased mating surface area, and the first and second pins 24 and 28 are guided into precision alignment with the torque ring 98.

Both iterations shown in FIGS. 8a and 8b have the benefit of creating greater torsional resistance as a result of greater surface area in mating contact as compared to a ring with a face perpendicular to the axis. A secondary benefit to such a configuration is the complimentary angles of the bifurcated taper on the ring will place into radial alignment the ring and the pin and thereby maximize surface area contact with a ring properly centered within the coupling.

Figure 9:
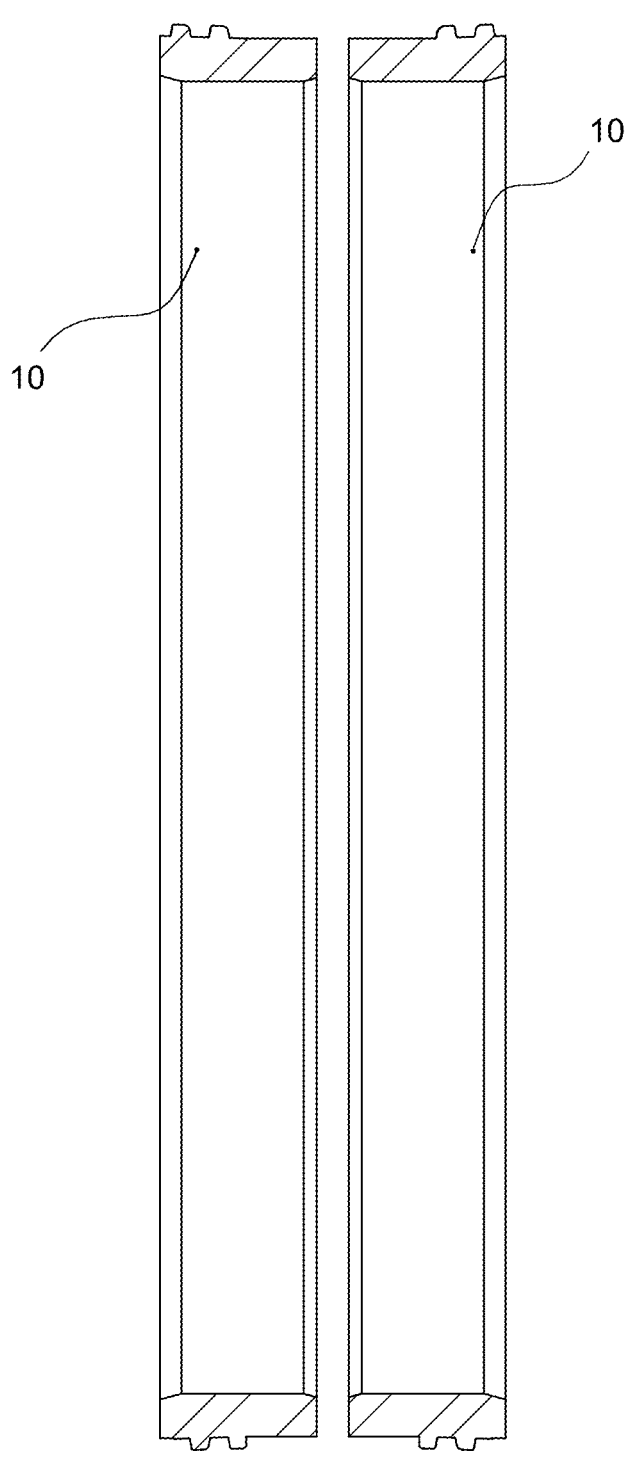
FIG. 9 depicts a sectional view of a pair of rings for placement within a single coupling.

FIG. 9 depicts a pair of rings for placement within a single coupling. Having two tapered rings within the J space of a coupling allows for even more flexibility in balancing radial interference from one side of the coupling to the other as is required when utilizing the string as a work string, running multiple trips into and out of the wellbore. Rather than exchange a thicker ring with progressively thinner rings as previously discussed, each ring can be placed according to the radial interference between pin and box members on each respective coupling side. As the threads begin to wear and threaded members begin to yield plastically, rather than replace one ring with another, the ring on the field end can merely be rotated further into the J space without need to add any additional rings. This process may be repeated until the rings are in mating contact and shoulder torque has become insufficient to further trip into the well.

Additionally, in a specific embodiment, a slight taper may be beneficially introduced toward the inside edge the shoulder ring, approximately 5-30% of the face width on each face of the ring. The subject taper may be provided to ensure that when a pin's localized plastic yielding force is reached, the nose of the pin is displaced in a radially outward direction. Such displacement causes the shoulder ring to "pinch" between ring and the collar.

The present inventions also have application when used with integral threaded connections having "upsets". Upsetting is a forging process that makes for a thicker wall on tube ends than is provided by the mill as plain end pipe. The tube ends are heated to a near liquid state. The heated end is then placed in an upsetter machine and held in a clamp. The machine is engaged, and it strikes the end of the tube with so much force metal flows backwards a few inches. The resultant contour is defined by the internal mandrel and external dies.

Figure 10:
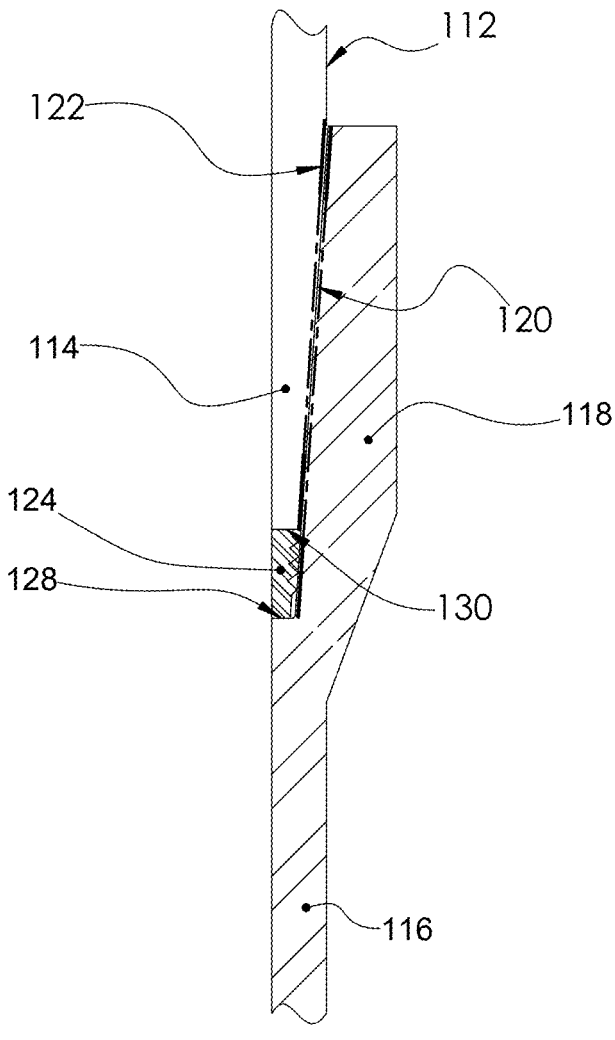
FIG. 10 depicts a side sectional view of an integral upset connection having upsets on both pin and box formed with a length of threads extending beyond the axial length of the pin to allow the placement of precisely dimensioned torque rings.
Figure 10A:
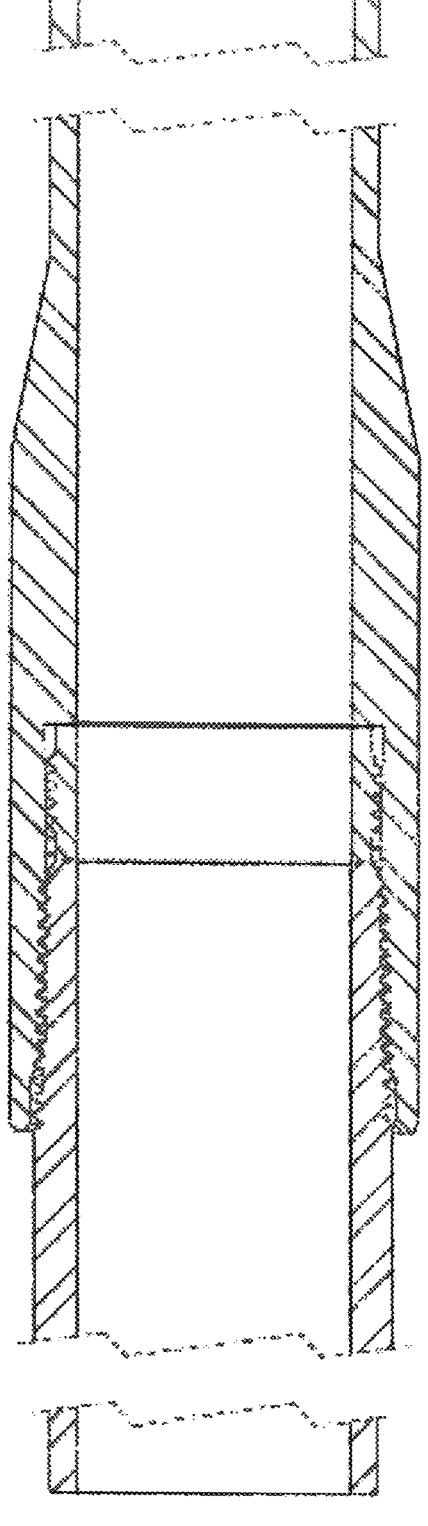
FIG. 10A is another view similar to FIG. 10.
Figure 11:
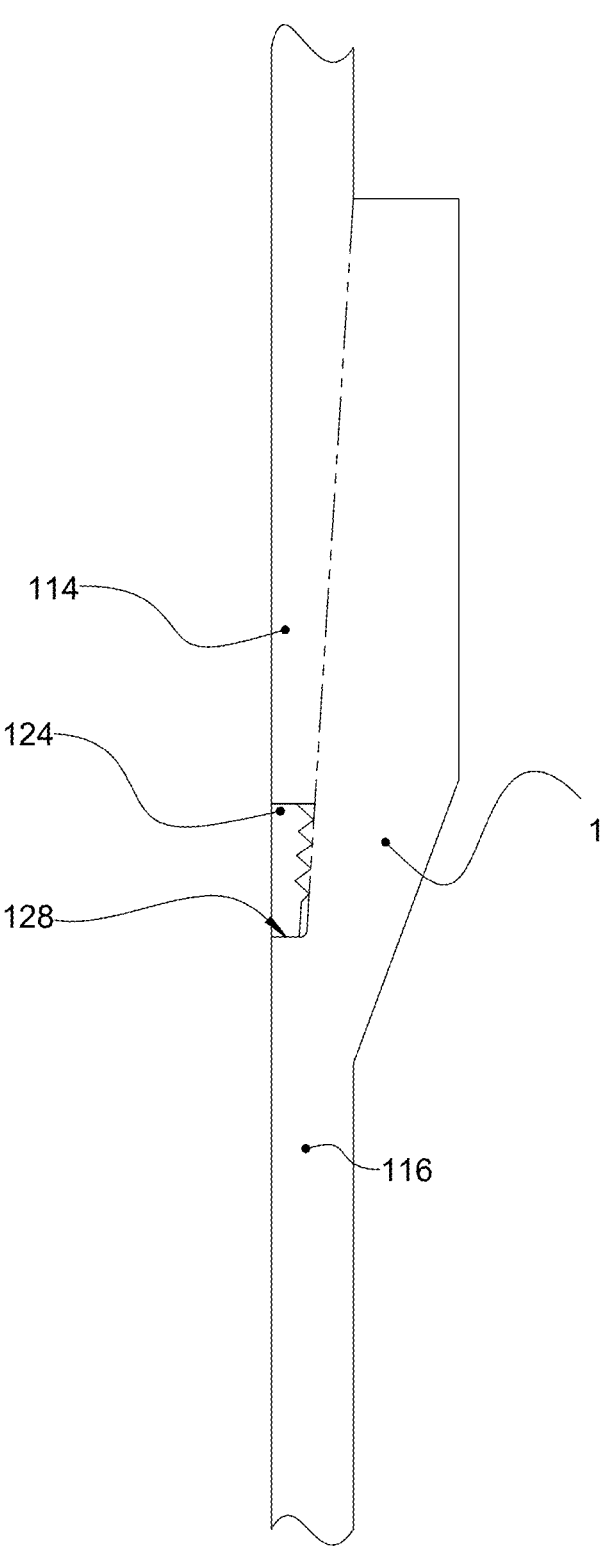
FIG. 11 depicts a detailed view of a portion of FIG. 10.

FIGS. 10 and 10a depict a side sectional view of an integral upset connection having upsets on both pin and box formed with a length of threads extending beyond the axial length of the pin to allow the placement of precisely dimensioned torque rings, while FIG. 11 depicts a detailed view of a portion of FIG. 10. In this embodiment, a first pipe 112 having a first pin 114 is shown coupled to a second pipe 116 without the use of a coupling. Instead, the second pipe 116 is provided with an upset box 118 having a plurality of box threads 120 adapted for mating engagement with a plurality of pin threads 122 on the first pin 114. A torque ring 124 is shown disposed in a "pseudo J space" 126 defined between an annular abutment 128 within the upset box 118 and a distal end 130 of the first pin 114.

Both the pin end (male threads) as well as the box end (female threads) may undergo this process to enhance the connection's mechanical strength. At the end of the engaged thread length, the box thread will continue a prescribed axial distance away from the coupling face or distal end 130 to an internal shoulder abutment 128, forming the "pseudo J space" 126. This allows for the installation and removal of rings with sequentially reducing axial widths, which will in turn maintain shoulder torques sufficient to allow for multiple make and breaks without a reduction in prescribed shoulder torque, and thus total torque.

Use of such rings in integral threaded connections has advantages over threaded and coupled connection using either torque rings or internal shoulder abutments located within a coupling. Since the connection has a box end on one length of pipe and a pin end on the other end of the pipe, they will screw together without the use of a coupling.

Such an embodiment thus reduces the number of threads produced from four to two, cutting threading time substantially in half. In addition, as is the case with API EUE 8rd connections, both ends already undergo upsetting on both ends of the length of pipe.

While the preferred embodiment employs threaded cylindrical threads across half of the torque ring, there exists no limitation to the form of the ring if it can maintain a prescribed shoulder torque by removal and reinstallation of a ring with a shorter axial length.

Method(s) of Use

In operation, the rings of the present inventions can be used in any number of different beneficial methods including, without limitation, the methods disclosed herein. Since certain disclosed embodiments comprise use of rings in an API connection, economically produced and featuring a connection so robust it can be "tripped" many times within a wellbore, the rings of the present inventions can be used as with pipe serving as a work string or a combination drill string, and also as a production string.

In the case of a work string, said work string can be offered either as a rental string or an end user owned item. A typical work string often will require reworking after each well on which it is implemented and can easily cost $60,000 or more for such remediation. In contrast, using a system of interchangeable abutments has a much greater service life before any reworking is required since shoulder torque remains acceptable through the control of hoop stresses within the connection despite plastic deformation and thread wear endemic to all tapered threads required to be made and broken multiple times.

When one string is used to carry out both drillout (or other down hole operation) and production from subterranean reservoirs, economic and time saving advantages increase substantially. Logistically, there are fewer parts to manage. Trucking costs are greatly reduced. String refurbishment is eliminated, as well as all costs associated with its management. Total working rig time is likewise reduced with one string to run. Thread preparation, moving pipe about the well site, rig up and rig down and use of multiple service companies are all costs which are reduced by this process.

The scope of the present inventions may be practiced with any type of threaded and coupled connection, or integral connection, both formed with a J space to allow selective placement of a torque ring, suited to match the initial and changing included thread interference and thread wear, or with couplings having sequentially shortening of their center axial abutments The following should precede offering any of the iterations contemplated for commercial use. By way of illustration, but not limitation, the following is an example of a representative method of the present inventions in connection with an EUE 8rd connection, including illustrative manufacturing and operational steps:

Materials and Processors

One or more processors should be identified and certified to produce parts as required for the string. The criteria for selection should include some combination the following: a signed NDA and check of handling procedures for confidential information, including trade secrets; verification of all processing equipment and gauges, within the certification period; certification shall include training of personnel who will handle any element of production to closely follow the specifications of each part to maintain quality production and increase the ability to identify non-conformity; verifications of all licenses required (for example a current API License to thread API tubing and Casing Connections as well as API Rotary Connections); demonstration of understand and ability to follow all design and marking criteria including the production and testing of samples, such production being repeatable and agreement on inspection with applicable paperwork; periodic audits to be conducted to assure compliance with all prescribed procedures, the frequency of which to be determined by audit results; all material used to produce any part must be approved prior to use and accompanied by MTR's. In the case of tubing or casing, when an upset is required, "green pipe" must be approved and may be subject to visual inspection prior to acceptance. All MTR's must accompany all pipe wherein multiple heats are used. All heats applicable to the production of couplings must likewise accompany all heats with prior approval. Accessories may not be produced or used unless the manufacture has all applicable licenses and traceability unless otherwise agreed to between end user.

Analysis of Job Requirements

Will the pipe string be suitable to the end user's requirements based on well condition, chemistry requirements due to environmental conditions and mechanical properties mandated for the string, including anticipated torque requirements.

Sufficient time to procure, process and deliver material.

Sufficient manpower available during the period required.

Sufficient equipment available during the period required.

Opportunity cost of committing to a well/program versus others.

Ability to control well services sufficient to ensure proper running and handling of the string and accessories.

During Performance of An Operation

Safety

Hold safety meeting.

Highlight all Hazards introduced by moving, working around and making contact with specified equipment.

All equipment, appropriate tools and proper personal protection equipment.

Ensure some combination of the following materials are on hand: Breakleen; grease; rope; bolt blaster; electric drills w/spare battery packs each; Power strip+Charger(s) sufficient to charge all batteries at once; Oil Absorbent Pads; Roll of Visqueen; Big box of rags; Box painter's sticks (wipe out couplings before use of rags); Wide flat files; Triangle files; Locktite (red); Yellow painter's pens; Drift mandrel; Brass wire wheel; Scotch brite; Air tool for drill wheels; Multifinishing wheel; Flashlights; Extra AA or AAA batteries; Mineral Spirits; MRP Gauge; ID Gauge; Gauge blocks/Set Standard; Hand Calipers; Emery/sand paper strips; Scotch Brite Pads; BOL 2000; Moustache Brushes; Neoprene gloves; Carabiners; Cordage; walkie talkies; First aid kit; Generator; Air Compressor; and Air tools and hoses.

Process/Operation

Ensure all equipment requiring certification is up to date.

Personnel must have certification as required.

Serial numbers on equipment must match delivery ticket.

Have running and handling procedures on hand.

Have torque ring procedures on hand.

Pipe on hand will have couplings bucked on prior to being on location; remove all thread protectors clean and inspect all threads for galls or other defects.

Measure and document the length from the mill side pin end face to the field end coupling face.

Install the appropriate torque ring, usually the widest available on the initial run.

Measure and record length between exposed ring face and coupling.

Reapply dope to box with Best-O-Life 2000 and reinstall thread protectors.

Prior to running, remove box protector.

Measure each joint for overall length and record.

Rig up service rig, BOP, Set plug and prepare to remove hanger and pull tubing.

Ensure tubing tongs are rigged up including torque controls and tested.

Pull and lay down existing tubing with the wellbore.

Rig up bucking unit and test with torque control unit.

If required, prepare to make into doubles.

Set minimum, optimum and maximum torque.

Set minimum shoulder torque.

Set maximum make-up speed.

Ensure tubing tongs are rigged up including torque control and tested.

Make up crossovers to power swivel and saver subs.

Install couplings to position and record torque.

Install ring(s) and dope box.

Dead stick power swivel using backup tongs and gauge or tubing tongs and record pressures below at and above optimum torque.

If running doubles, roll stand onto catwalk and deliver to the rig floor.

Latch elevators onto tubing stand and hoist into the derrick.

If pipe is pulled through the v door, leave pin protectors on.

Apply thread dope to pin end and stab into the milling/fishing BHA, make up three turns by hand, then make up with power tongs to the prescribed torque.

Open BOP's and run pipe into the wellbore, continuing to apply dope to pin end, make up by hand and then making connection up to the prescribed torque.

Closely monitor torque, during tripping operations, if the shoulder torque drops below the prescribed torque remove ring and insert new ring of shorter axial length.

If a high number of trips is indicated, remove coupling and mate pin field end to box field end and insert new ring.

The use of a stabbing guide may be required or desired.

Mill on production packers as per fishing company recommendations until packer has been fully washed over and can be retrieved.

Pull out of hole with fish racking stands (if running doubles or other multi-joint pipe segments).

Once Fish and BHA is at surface, shut in well.

Remove Fish and BHA from tubing string.

Pick up clean out BHA and make up to the bottom of the wellstring.

Trip in hole with tubing to prescribed depth, makeup tubing swivel to the string and begin to circulate and rotate tubing to clean out the wellbore tubing.

Continue to circulate and rotate the tubing adding stands until final depth has been reached.

Pull out of hole and lay out a prescribed length of tubing, racking the rest back in stands if running doubles or other multi joint pipe segments.

Once BHA reaches the surface, close BOP's and break out BHA from tubing string.

Make up any tubing nipples and reentry guides to the bottom of the tubing strings, run back in the hole with a prescribed length of tubing, make up hanger and land in well head.

Production string should be made up to a prescribed torque value necessary to land the string (often less than when the string is used in drilling, milling or other downhole operations).

When tripping pipe, close attention to shoulder torque values must be observed. If torque is approaching a prescribed value, the connection should be broken and a new ring having a shorter axial length should be installed.

To the extent possible, given time, safety and company policy limitations, threads should be inspected and dressed.

If a gall or other imperfection is determined to cause risk of failure to a connection, it must be either sufficiently dressed or laid down, if such damage is not repairable.

As soon as is possible, a post-job analysis should be undertaken to assess performance, protocol and room for improvement.

All equipment should be cleaned, inventoried, and neatly packed prior to leaving the jobsite.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A coupled pipe connection system comprising:
a coupling having a bore therethrough defining an inner surface having a plurality of tapered inner threads disposed on opposite ends of the coupling, and tapering toward a central portion of the coupling where an inner diameter of the coupling is smaller than inner diameters of the coupling at the opposite ends of the coupling;
a first pipe having a first pin, the first pipe having an inner cylindrical surface and an outer cylindrical surface, the outer cylindrical surface including a plurality of tapered outer threads disposed therearound, the tapered outer threads on the first pipe being threadably engaged with the tapered inner threads on a left mill side of the coupling;
a second pipe having a second pin, the first pipe having an inner cylindrical surface and an outer cylindrical surface, the outer cylindrical surface including a plurality of tapered outer threads disposed therearound, the tapered outer threads on the second pipe being threadably engaged with the tapered inner threads on a right field side of the coupling; and
a torque ring disposed within the coupling and between the first pin and the second pin, the torque ring having an inner cylindrical surface, an outer cylindrical surface, and an outer tapered threaded surface having a plurality of tapered threads engaged with and tapered to match a mid-length axial section of the inner threads of the coupling.

2. The coupled pipe connection system of claim 1, wherein inner diameters of the first pin, the second pin, and the torque ring are substantially equal.

3. The coupled pipe connection system of claim 1, wherein the first pin, the second pin, and the torque ring are in co-axial alignment so that the inner cylindrical surfaces of the torque ring, the first pipe and the second pipe define a cylindrical bore within the connection system.

4. The coupled pipe connection system of claim 1, wherein a major diameter of the tapered threads on the torque ring are adjacent a field end face of the torque ring, and the field end face of the torque ring is in contact with a field end face of the second pin.

5. The coupled pipe connection system of claim 1, wherein the torque ring is centrally positioned radially and axially with the mid-length axial section of the coupling.

6. The coupled pipe connection system of claim 1, wherein an axial length of each of the threads on the outer surface of the torque ring is less than an axial length of each of the outer threads on the first and second pins.

7. The coupled pipe connection system of claim 1, wherein the threads on the outer surface of the torque ring are truncated.

8. The coupled pipe connection system of claim 1, wherein the torque ring includes at least one bevel formed towards a center outer diameter of the torque ring.

9. The coupled pipe connection system of claim 1, wherein the torque ring includes at least one bevel formed away from a center outer diameter of the torque ring.

10. The coupled pipe connection system of claim 1, wherein the torque ring includes a planar face section and a beveled surface extending downwardly from the planar face section and away from a central inner diameter of the torque ring to form opposed first and second beveled surfaces adapted for engagement with corresponding internal chamfers on the internal cylindrical surfaces of the first and second pipes.

11. The coupled pipe connection system of claim 1, wherein the torque ring includes a planar face section and a beveled surface extending upwardly from the planar face section and away from a central outer diameter of the torque ring to form opposed first and second beveled surfaces adapted for engagement with corresponding external chamfers on the outer cylindrical surfaces of the first and second pipes.

12. A coupled pipe connection system including interchangeable torque rings comprising:
a coupling having a bore therethrough defining an inner surface having a plurality of tapered inner threads disposed on opposite ends of the coupling, and tapering toward a central portion of the coupling where an inner diameter of the coupling is smaller than inner diameters of the coupling at the opposite ends of the coupling;
a first pipe having a first pin, the first pipe having an inner cylindrical surface and an outer cylindrical surface, the outer cylindrical surface including a plurality of outer threads disposed therearound, the outer threads on the first pipe being threadably engaged with the inner threads on a left mill side of the coupling;
a second pipe having a second pin, the second pipe having an inner cylindrical surface and an outer cylindrical surface, the outer cylindrical surface including a plurality of outer threads disposed therearound, the outer threads on the second pipe being threadably engaged with the inner threads on a right field side of the coupling; and
at least a first torque ring, and a second torque ring, each of the torque rings being adapted to be sequentially disposed within the coupling and between the first pin and the second pin, each torque ring having an inner cylindrical surface and an outer cylindrical surface, at least a portion of the outer cylindrical surface of each torque ring including a plurality of threads engaged with and dimensioned to match a mid-length axial section of the inner threads of the coupling, the mid-length axial section having a J-space length, the first torque ring having an axial length not greater than the J-space length, and the second torque ring having an axial length less than the axial length of the first torque ring.

13. The coupled pipe connection system of claim 12, wherein the threads on the outer cylindrical surface of the torque ring are cylindrical threads partially extending across an axial length of the torque ring.

14. The coupled pipe connection system of claim 12, wherein the threads on the outer cylindrical surface of the torque ring are cylindrical threads fully extending across an axial length of the torque ring.

15. The coupled pipe connection system of claim 12, wherein the threads on the outer cylindrical surface of the torque ring are tapered threads partially extending across an axial length of the torque ring.

16. The coupled pipe connection system of claim 12, wherein each of the first torque ring and the second torque ring is simultaneously disposed within the coupling and between the first pin and the second pin.

17. The coupled pipe connection system of claim 12, wherein an axial length of each of the threads on the outer surface of the torque ring is less than an axial length of each of the outer threads on the first and second pins.

18. The coupled pipe connection system of claim 12, wherein the threads on the outer surface of the torque ring are truncated.

19. The coupled pipe connection system of claim 12, wherein the torque ring includes at least one bevel formed towards a center outer diameter of the torque ring.

20. The coupled pipe connection system of claim 12, wherein the torque ring includes at least one bevel formed away from a center outer diameter of the torque ring.

21. The coupled pipe connection system of claim 12, wherein each of opposed faces of the torque ring includes a planar face section and a beveled surface extending downwardly from the planar face section and away from a central inner diameter of the torque ring to form opposed first and second beveled surfaces adapted for engagement with corresponding internal chamfers on the internal cylindrical surfaces of the first and second pipes.

22. The coupled pipe connection system of claim 12, wherein each of opposed faces of the torque ring includes a planar face section and a beveled surface extending upwardly from the planar face section and away from a central outer diameter of the torque ring to form opposed first and second beveled surfaces adapted for engagement with corresponding external chamfers on the outer cylindrical surfaces of the first and second pipes.

23. A coupled pipe connection system comprising:

a first pipe having a first pin, the first pin having an inner cylindrical surface and an outer cylindrical surface, the outer cylindrical surface including a plurality of outer threads disposed therearound;

a second pipe having an upset box and a main body, the upset box including an internal annular surface having a plurality of tapered box threads disposed therein, the internal annular surface terminating in an annular abutment joining the internal annular surface of the upset box to a main cylindrical bore within the main body, the plurality of outer threads on the first pipe being threadably engaged to the tapered box threads; and at least one torque ring disposed within the upset box and between a distal end of the first pipe and the annular abutment within the second pipe, each torque ring having an inner cylindrical surface, an outer cylindrical surface, and an outer threaded surface at least a portion of the outer cylindrical surface including a plurality of tapered threads engaged with the box threads.

24. The coupled pipe connection system of claim 23, wherein inner diameters of the first pin, the second pipe, and the torque ring are equal.

25. The coupled pipe connection system of claim 23, wherein the first pin, the second pipe, and the torque ring are in co-axial alignment so that the inner cylindrical surfaces of the torque ring, the first pin and the second pipe define a cylindrical bore within the connection system.

26. The coupled pipe connection system of claim 23, wherein an axial length of each of the threads on the outer surface of the torque ring is less than an axial length of each of the outer threads on the first pin.

27. The coupled pipe connection system of claim 23, wherein at least a portion of the threads on the outer cylindrical surface of the torque ring are cylindrical threads partially extending across an axial length of the torque ring.

28. The coupled pipe connection system of claim 23, wherein at least a portion of the threads on the outer cylindrical surface of the torque ring are cylindrical threads.

29. The coupled pipe connection system of claim 23, wherein the threads on the outer surface of the torque ring are truncated.

30. The coupled pipe connection system of claim 23, wherein the torque ring includes at least one bevel formed towards a center outer diameter of the torque ring.

31. The coupled pipe connection system of claim 23, wherein the torque ring includes at least one bevel formed away from a center outer diameter of the torque ring.

32. The coupled pipe connection system of claim 23, wherein each of opposed faces of the torque ring includes a planar face section and a beveled surface extending downwardly from the planar face section and away from a central inner diameter of the torque ring to form opposed first and second beveled surfaces adapted for engagement with corresponding internal chamfers on the internal cylindrical surfaces of the first and second pipes.

33. The coupled pipe connection system of claim 23, wherein each of opposed faces of the torque ring includes a planar face section and a beveled surface extending upwardly from the planar face section and away from a central outer diameter of the torque ring to form opposed first and second beveled surfaces adapted for engagement with corresponding external chamfers on the outer cylindrical surfaces of the first and second pipes.

\* \* \* \* \*